TUNING FORK FILTERS HAVING BROADENED BAND-PASS

Filed May 9, 1967

INVENTOR.
FRANK DOSTAL

BY [signature]

ATTORNEY

United States Patent Office 3,513,415
Patented May 19, 1970

3,513,415

TUNING FORK FILTERS HAVING BROADENED BAND-PASS

Frank Dostal, Elmhurst, N.Y., assignor to Bulova Watch Company, Inc., New York, N.Y., a corporation of New York Filed May 9, 1967, Ser. No. 637,152
Int. Cl. H03h 7/10
U.S. Cl. 333—71 7 Claims

ABSTRACT OF THE DISCLOSURE

A tuning fork filter having a reduced Q, wherein the input signal is applied to a drive coil adjacent the free end of one tine of the fork, the output signal being taken from a coil adjacent the free end of the other tine, at least one tine of the fork having an energy-absorbing or dampening element secured thereto to reduce the Q of the fork and thereby broaden the band-pass characteristics thereof.

This invention relates generally to tuning-fork controlled devices, such as filters and oscillators, and more particularly to a filter of this type wherein the Q of the fork is degraded to broaden the band-pass characteristic thereof.

A tuning fork is a mechanical resonator whose natural frequency is determined by the dimensions of its tines. The fork lends itself to use as an electrical wave filter, for it will act to pass electrical energy having a frequency corresponding to its natural frequency and to attenuate or reject all other frequencies. The band-pass characteristic of a tuning-fork filter depends essentially on the Q or efficiency of the fork, the higher the Q, the sharper the band-pass.

In a tuning-fork filter, the incoming signal is applied to an input or drive coil which is disposed adjacent one tine of the fork and acts electromagnetically to excite the fork when the signal lies within the band-pass of the filter. The excited fork generates a signal in an output coil disposed adjacent the other tine.

In many instances, the selectivity of a tuning-fork filter, which depends mainly on the Q of the fork, is greater than that dictated by a particular application. For example, if the filter is intended to respond to a signal of 500 Hz. derived from an oscillator and to pass this signal to a receiver tuned to 500 Hz., should the operating frequency of the oscillator or that of the receiver tend to stray a few cycles in either direction from its assigned value, a highly selective filter may render the transmit-receive system inoperative. On the other hand, should the filter have poor selectivity, it may fail to discriminate properly between a signal within a desired bandwidth and one outside this bandwidth.

Therefore, what one requires is a fork filter having an accuracy and stability commensurate with the requirements of the system incorporating the filter. Thus a filter with a Q of 2000, working at 500 Hz. has a bandwidth at 3 db points of ¼ Hz. This means that if the transmit and receive frequencies in the system are off by ⅛ of a Hz., the received signal will be down by 3 db. Hence a stability of 250 parts in a million under ambient temperature conditions, voltage variations and aging factors, would be the desideratum under these circumstances.

If the selectivity requirements are such that a Q of 200 is adequate, the accuracy and stability requirements are then broadened by 2500 parts in a million, or 1.25 Hz. This broadening of tolerance makes possible a considerable reduction in both the cost of the oscillator and the filter. In short, what is called for, is a tuning-fork filter having a Q which may be tailored to meet the requirements of a specific application.

Accordingly, it is the main object of this invention to provide a tuning-fork filter having a high-Q fork, to which are attached dampening elements which may be adjusted to degrade the Q to a desired extent.

More specifically, it is an object of the invention to provide a tuning-fork filter having a broadened band-pass characteristic which is attained by energy-absorbing elements secured to one or both tines of the fork.

Yet another object of the invention is to provide a filter of the above type, wherein the energy-absorbing elements are readily attached to the tines, and which may be easily adjusted to effect the desired reduction in Q.

Briefly stated, these objects are attained in a tuning-fork filter having a drive coil operatively coupled to one tine of the fork and responsive to an input signal, and a pickup coil operatively coupled to the other tine of the fork to derive an output signal therefrom, dampening elements being secured to at least one of said tines to absorb energy therefrom and thereby reduce the efficiency of the work, with a consequent increase in the band-pass characteristic thereof.

For a better understanding of the invention as well as other objects and further features thereof, reference is made to the following detailed description to be read in conjunction with the accompanying drawing, wherein.

Figure 3:
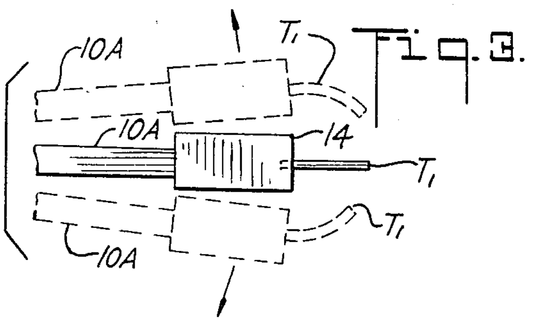
Figure 5:
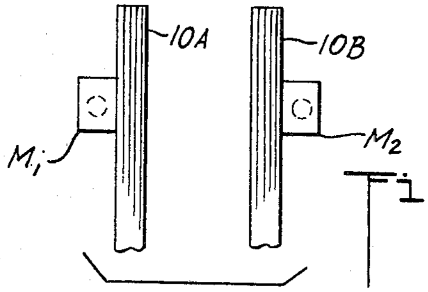
Figure 4:
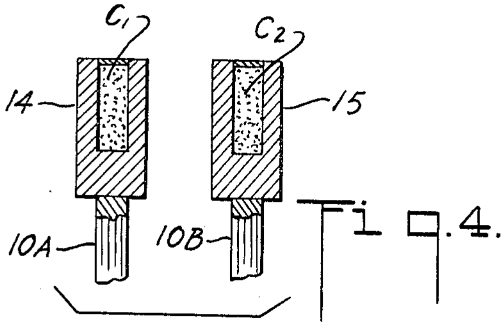
Figure 6:
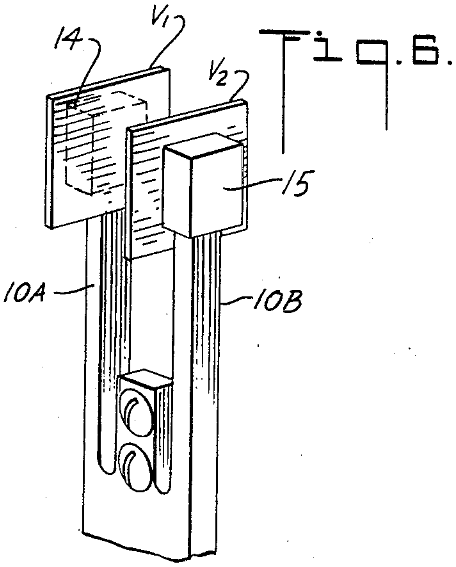
Figure 7:
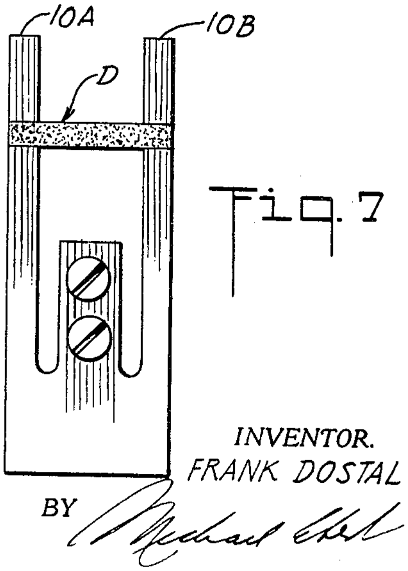

FIG. 3 schematically illustrates one vibrating tine of the fork with the tail wagging;

FIG. 4 is a sectional view of a portion of a tuning fork having tine armatures incorporating dampening elements of the powder or liquid type;

FIG. 5 illustrates in plan view a tuning fork provided with capsule-type dampening elements;

FIG. 6 shows in perspective a tuning fork with vane-type dampening elements; and FIG. 7 is a plan view of a tuning fork with a bridge-type dampening element.

Figure 1:
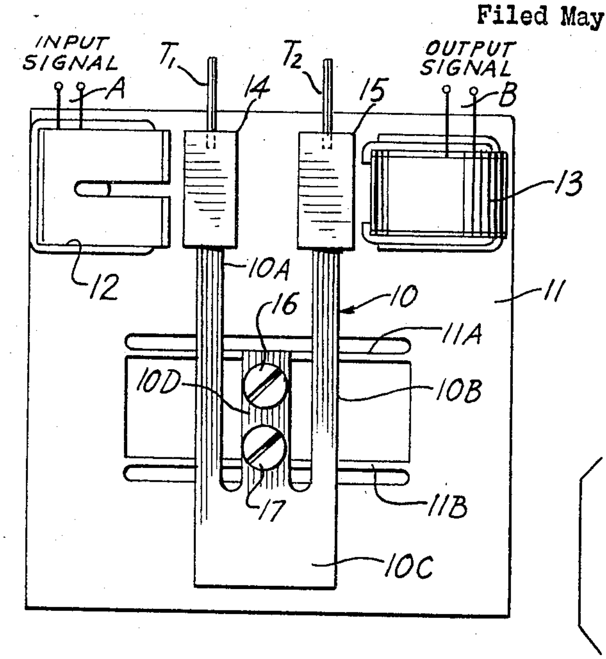
FIG. 1 illustrates in plan view a tuning-fork filter incorporating dampening elements in accordance with the invention, which are of the tail type.
Figure 2:
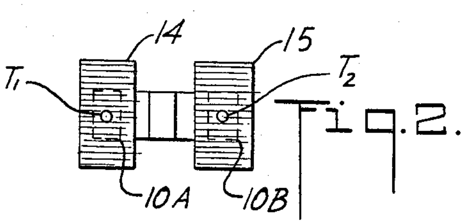
FIG. 2 is an end view of the tail-type tuning-fork filter.

Referring now to the drawing, and more particularly to FIGS. 1 and 2, a tuning-fork filter in accordance with the invention comprises a U-shaped tuning fork, generally designated by numeral 10, a compliant mounting plate 11 therefor, an input or drive electromagnet 12 acting in conjunction with one tine of the fork and an output electromagnet 13 acting in conjunction with the other tine. Tuning fork 10 is constituted by a pair of tines 10A and 10B, at the ends of which are attached armature elements 14 and 15 which also function as shields.

The tuning-fork filter shown herein, is of the type disclosed in greater detail in my copending application, Ser. No. 624,351, filed Mar. 20, 1967, entitled "Tuning Fork Filters with Reduced Cross-Talk" (now abandoned). It is to be understood that this particular embodiment of a filter is shown only by way of example, and that in practice any known form of tuning-fork filter may be used.

Tines 10A and 10B of the fork project upwardly from a common base portion 10C which is provided with an internal mounting stud 10D extending midway between the tines. The internal mountig stud serves to support the fork at its center of movement, thereby considerably reducing the effect of shock and vibration thereon, as well as shortening the over-all length of the fork as compared to an external mounting stud. Mounting plate 11 is rectangular in form, and includes a rectangular aperture which is bridged by two bendable beams 11A and 11B, disposed in parallel relation, the beams being interconnected at their mid-sections by a transverse platform. The beams and platforms are preferably integral with plate 11, this being accomplished by cutting multiple slots in a solid plate to define these elements.

Tuning fork 10 is mounted on the plate by two screws 16 and 17 which join stud 10D to the platform bridging the beams, the tuning fork being disposed in a plane parallel to the plane of the mounting plate, whereby the tines of the fork, which are free to vibrate, are normal to the longitudinal axis of the beams 11A and 11B.

Since tines 10A and 10B vibrate along an arcuate path, an axial component of motion is produced which travels toward base 10C. In the event the mounting were rigid, this axial motion would in turn be transmitted to the mounting plate, thereby mechanically exciting the plate and reducing the Q of the filter. But by supporting the fork on bendable beams, this imparts a degree of compliance to the mounting effectively to decouple the fork and mounting with respect to the axial component of fork motion. The compliant mounting is also capable of rotation so as to decouple the fork in regard to non-axial components of motion, as well as those which are axial.

In operating as a filter, an input signal is applied to electromagnet 12, while an output signal is derived from electromagnet 13. Electromagnet 12 is constituted by two L-shaped pole pieces fabricated of soft iron or Permalloy, the pieces being joined together at the center of their long sides by a permanent magnet rod surrounded by an input coil to which the input signal is applied at terminals A to produce an electromagnetic field in the air gap existing between the adjacent ends of the short sides of the pole pieces.

If the field frequency lies within the band-pass characteristic of the filter, that is, if it corresponds to or closely approaches the resonance frequency of the fork, the tine will be actuated, thus setting the tuning fork in vibration, whereby the reciprocation of armature 15 with respect to the pickup or output electromagnet 13 will induce a corresponding signal therein, which will appear at output terminals B.

The structure of electromagnet 13 is identical to that of electromagnet 12, but electromagnet 13 is attached or bonded to the mounting plate, so that its coil and magnet rod are perpendicularly disposed with respect to the corresponding coil and rod in electromagnet 12 and its air gap is at right angles to the air gap of electromagnet 12, thereby minimizing magnetic coupling therebetween to reduce cross-talk.

In practice, in lieu of distinct armatures, the tines themselves may be of a paramagnetic material and serve as armatures with respect to their associated coils. However, by the use of the relatively thick armatures 14 and 15 of a metal having shielding characteristics, the armatures also serve to reduce magnetic coupling. For higher frequencies, the thickness of the armatures must be reduced, but the other dimensions may be maintained for shielding effects.

The tuning-fork filter of the type described above has a relatively high Q, and therefore is highly selective. In order to reduce the Q of the filter to broaden its band-pass characteristics, tails $T_1$ and $T_2$ are attached to the end walls of armatures 14 and 15, the tails projecting therefrom in axial alignment with the tines 10A and 10B. The tails are made of rubbery material, such as neoprene or silicone rubber, and are anchored in small holes bored in the armatures and held thereto by a suitable bonding agent, such as an epoxy resin.

The tails act to absorb energy from the tines as they vibrate and thereby dampen the action of the fork to reduce the Q thereof. As shown in FIG. 3, as the armature 14 vibrates, the tail $T_1$ secured thereto wags in a direction opposed to the direction of vibration, thus producing a dampening action.

The degree of energy absorption is a function of the length of the tail. The tail may readily be clipped, to shorten its length, thereby adjusting the degree of damping. In practice, the Q may be reduced by a factor as high as 10 or greater. A tail may be attached to but a single tine of the fork to bring about a smaller reduction in damping. Also, instead of extending the tails axially from the armature, they may be extended laterally therefrom.

Referring now to FIG. 4, another technique for reducing the Q is shown, this being accomplished by creating small tubular chamber $C_1$ and $C_2$ within armatures 14 and 15, and partially filling these chambers with a powder or liquid which is activated as the tines vibrate, to absorb energy. These chambers may be bored in the axial or lateral direction. In practice, the powders are preferably of fine spherical form to prevent bunching thereof and may be used on one or both tines to reduce the Q by a large factor up to and over 10, or to a lesser degree, depending on the filter requirements.

As shown in FIG. 5, separate capsule members $M_1$ and $M_2$ for containing energy-absorbing powder may be attached to the tines, the operation otherwise being similar to the embodiment in FIG. 4.

Another approach is shown in FIG. 6, wherein vanes $V_1$ and $V_2$ are attached to armatures 14 and 15 in parallel relation, the vibrating vanes acting to compress the atmosphere therebetween to produce windage effects, thereby damping the vibratory action of the fork. The vanes can be made of any rigid material, preferably a high-permeability type, such as Mu-metal, to afford extra shielding between the drive and pickup coils, thereby further reducing cross-talk.

In one actual embodiment of the invention, using vanes ⅜″ x ⅜″, spaced 1⁄16″ apart, a 400-cycle fork with a Q of 5200, was reduced to a Q of 600, while cross-talk was down 70 db at 10% off resonance in air at an atmosphere of one. The degree of damping is controllable by the area and spacing of the vanes, and the type and pressure of the gas filling the fork enclosure. Carbon dioxide, for example, has three times the effect of air on the damping.

In the embodiment shown in FIG. 7 a dampening element D is bridged across tines 10A and 10B of the fork, the element being formed of a rubbery material similar to that used in FIG. 1. The ends of the element may be attached to the tines by a semi-flexible epoxy cement. The degree of dampening is a function of the distance between the base of the fork and the point of connection on the tines. The element D may also be connected between the inner walls of the tines and hence lie flush with the face of the fork.

Damped forks are not limited in their application to filter devices, for they may also be used in tuning-fork oscillator circuits. Oscillator forks dampened by the expedients disclosed hereinabove, exhibit a sharp decrease in Q, with increasing amplitude of vibration. This means that the transmission losses also increase sharply. This has utility in tuning-fork oscillators, in providing a limiting action. Since this action takes place in the fork, and since it still has a relatively high Q in the order of 100 to 1000, the wave shape in the associated circuit is sinusoidal. This action is similar to that attained electronically by automatic gain control to achieve a sine wave output.

While there have been shown and described preferred embodiments of tuning-fork filters having broadened band-pass, in accordance with the invention, it will be appreciated that many changes and modifications may be made therein without, however, departing from the essential spirit of the invention as defined in the annexed claims.

What I claim is:

1. A tuning-fork controlled band-pass filter comprising:

(a) a high-Q tuning fork having a pair of tines, (b) electromagnetic input means responsive to an input signal operatively coupled to one tine of said fork to cause it to vibrate at its natural frequency, and electromagnetic output means operatively coupled to the other tine to derive an output signal therefrom only when said fork is caused to vibrate, said high-Q fork and said input and output means together constituting a band-pass filter having a relatively narrow band-pass characteristic, (c) means secured to at least one tine of said fork to absorb energy therefrom and thereby to dampen the fork vibration to reduce the Q of the fork and thereby broaden the band-pass characteristic of said filter, and (d) means to apply an input signal from an external source to said input means to cause said fork to vibrate only if the frequency of the signal lies within the broadened band-pass of said filter.

2. A device as set forth in claim 1, wherein said means is a wagging tail secured to at least one tine and formed of rubbery material which may be clipped.

3. A device as set forth in claim 1, wherein said means is constituted by a chamber formed in an armature secured to one of said tines and containing loose powder activated by the fork vibration.

4. A device as set forth in claim 1, wherein said means is constituted by a capsule containing loose powder activated by the fork vibration and secured to one of said tines.

5. A filter as set forth in claim 1, wherein said means is constituted by a pair of vanes whose faces lie in parallel relation, said vanes being secured to said tines and being broader than said tines to compress the atmosphere therebetween as the tines vibrate.

6. A device as set forth in claim 5, wherein said filter is contained in an atmosphere of carbon dioxide.

7. A device as set forth in claim 1, wherein said means is formed by a rubber-like element bridging the tines.

References Cited

UNITED STATES PATENTS

| | | | |
|---|---|---|---|
| 2,522,302 | 9/1950 | Roth | 84—409 |
| 3,350,667 | 10/1967 | Shreve | 333—71 |
| 3,354,413 | 11/1967 | Ko | 333—72 |
| 3,344,367 | 9/1967 | Takahashi | 333—71 |
| 3,361,994 | 1/1968 | Takahashi | 333—71 |
| 3,303,705 | 2/1967 | Dostal | 84—409 |
| 2,469,951 | 5/1949 | Cooley | 84—457 |

HERMAN KARL SAALBACH, Primary Examiner

C. BARAFF, Assistant Examiner

U.S. Cl. X.R.

84—409, 457; 310—25